United States Patent [19]

Fujimori et al.

[11] 4,224,140
[45] Sep. 23, 1980

[54] PROCESS FOR PRODUCING CRACKED DISTILLATE AND HYDROGEN FROM HEAVY OIL

[75] Inventors: Kuniaki Fujimori, Tokyo; Yoshihito Satomi, Kurashiki; Teruo Suzuka, Kawaguchi; Shirou Aizawa, Toda, all of Japan

[73] Assignee: Nippon Mining Co., Ltd., Tokyo, Japan

[21] Appl. No.: 22,385

[22] Filed: Mar. 21, 1979

[30] Foreign Application Priority Data

Jan. 30, 1979 [JP] Japan ................................ 54/9413

[51] Int. Cl.$^2$ .................... C01B 1/08; C01G 48/08; C10G 13/02; C10G 34/00
[52] U.S. Cl. .................................. 208/124; 208/109; 208/113; 208/255; 423/148; 423/658
[58] Field of Search .............. 208/124, 255; 423/658, 423/148

[56] References Cited

U.S. PATENT DOCUMENTS

| 2,635,947 | 4/1953 | Reed et al. ........................... 423/658 |
| 2,888,395 | 5/1959 | Henny ............................. 423/658 X |
| 3,017,250 | 1/1962 | Watkins ........................... 423/658 X |
| 4,046,670 | 9/1977 | Seguchi et al. .................. 208/48 AA |
| 4,126,668 | 11/1978 | Erickson ............................ 423/657 |

Primary Examiner—Herbert Levine
Assistant Examiner—G. E. Schmitkons
Attorney, Agent, or Firm—Sughrue, Rothwell, Mion, Zinn and Macpeak

[57] ABSTRACT

A process for producing a cracked distillate and hydrogen from a heavy oil which comprises cracking the heavy oil in the presence of laterite or a laterite-containing catalyst while simultaneously depositing coke on said laterite or laterite-containing catalysts, reducing the laterite or laterite-containing catalyst on which the coke is deposited, and forming a hydrogen-rich gas by contacting the reduced laterite or laterite-containing catalyst with steam.

15 Claims, 1 Drawing Figure

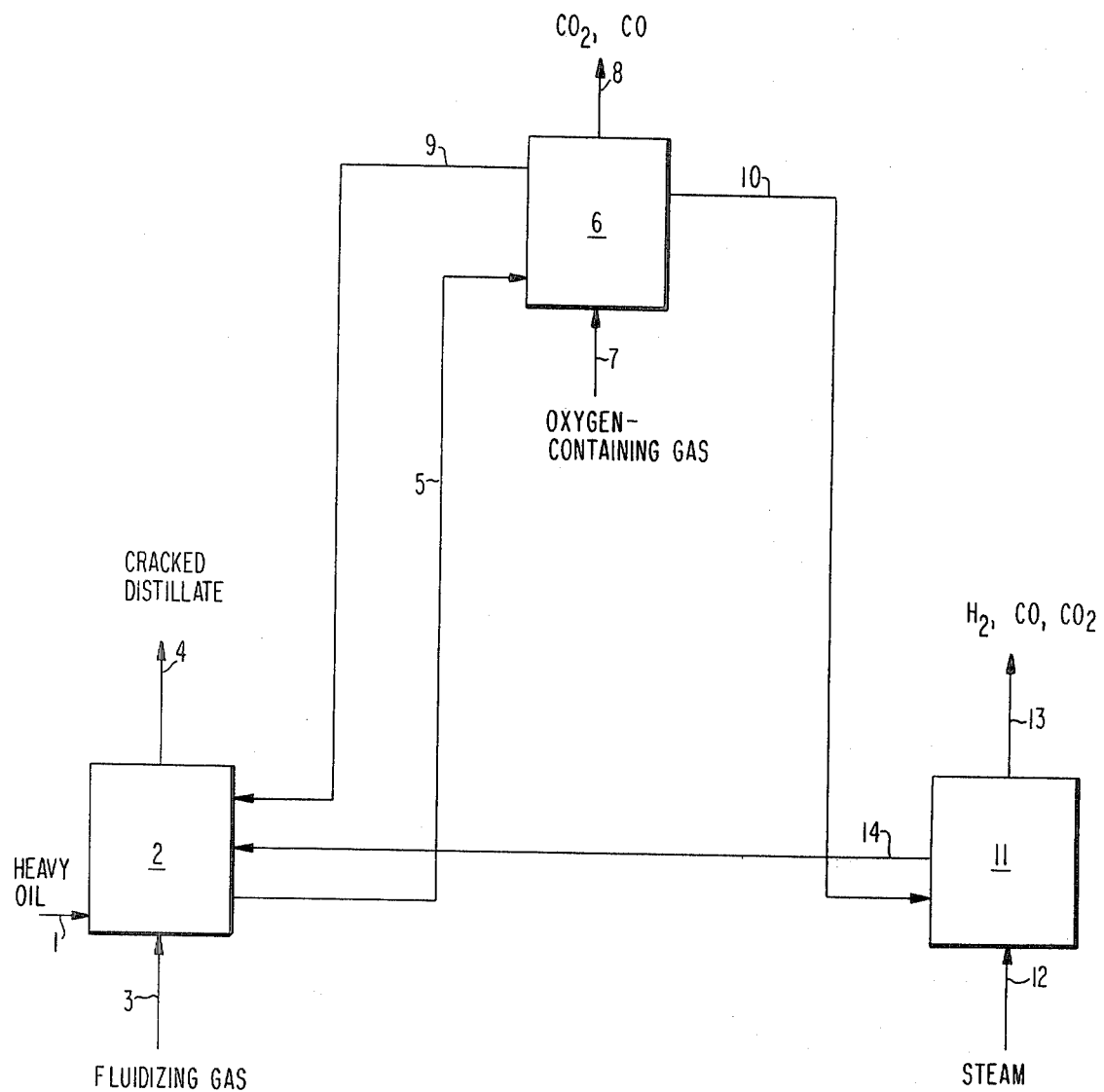

PROCESS FOR PRODUCING CRACKED DISTILLATE AND HYDROGEN FROM HEAVY OIL

BACKGROUND OF THE INVENTION

1. Field of the Invention

The present invention relates to a process for producing a cracked distillate and hydrogen from a heavy oil.

2. Description of the Prior Art

The present inventors previously invented a process which comprises catalytically cracking a heavy oil (e.g., atmospheric residual oil, vacuum residual oil, etc.) in the presence of a nickel ore, by which heavy metals contained in the heavy oil are removed and the heavy oil is cracked (see Japanese Patent Application (OPI) No. 10202/74). However, it has been found that if the above-described heavy oil is subjected to catalytic cracking in the presence of laterite or a laterite-containing catalyst (hereinafter, both are referred to as laterite catalysts), coke is formed on the laterite catalyst as the heavy oil is cracked to a distillate oil, and when the laterite catalyst on which the coke is deposited is heated in a gas stream, the iron oxides in the laterite catalyst are very rapidly reduced and hydrogen is easily formed by bringing the reduced catalyst into contact with steam.

Hitherto, a process has been proposed for producing gaseous hydrocarbons and a hydrogen-rich gas which comprises catalytically cracking a heavy oil in the presence of a catalyst which carries an oxide of a metal such as nickel or vanadium on bauxite to crack the heavy oil and to deposit coke on the catalyst, and contacting the catalyst on which coke is deposited with steam (see Japanese Patent Publication No. 30596/75 and U.S. Pat. No. 3,726,791). However, in this process, the catalyst is a so-called synthetic catalyst and contains components which deteriorate at high temperatures such as alumina, and deterioration of the catalyst is unavoidable upon reaction at high temperatures. Further, in this process, since the catalyst on which the coke is deposited is brought into contact with steam, the hydrogen concentration in the gas from a gasification zone does not become high because carbon monoxide and carbon dioxide are generated by the reaction of coke and steam.

In addition, a process for the production of hydrogen using metalliferrous steam reducing agent-containing particles has been proposed (see U.S. Pat. No. 3,017,250). However, in this process the catalyst is a synthetic catalyst similar to the above-described patents, and the reaction system employed therein comprises four zones, i.e., a coking zone, a heating zone, a regeneration zone and a reaction zone, and a cracked gas is used as the reducing gas. As described above, since in U.S. Pat. No. 3,017,250 the heating (exothermic) and regeneration (endothermic) are individually performed, the step for circulating the catalyst is complicated, and further, since the exothermic zone and endothermic zone are individually provided, the amount of the catalyst which is circulated in the system increases, leading to an increase of attrition of the catalyst.

SUMMARY OF THE INVENTION

It is the object of the present invention to provide a process for producing a cracked distillate and a hydrogen-rich gas from a heavy oil using laterite or a laterite-containing catalyst.

Another object of the present invention is to provide a process for the production of substantially pure hydrogen by the reaction of steam and the reduced laterite or reduced laterite-containing catalyst.

It is a further object of this invention to provide a continuous process for the production of a cracked distillate and hydrogen wherein the laterite or laterite-containing catalyst is fluidized and successively contacted with the heavy oil, and oxidizing gas, and steam.

Still another object of the present invention is to provide a process for the production of a cracked distillate and hydrogen wherein a heavy oil is cracked under coking conditions and simultaneously coke is deposited on the laterite or laterite-containing catalyst.

These and other objects of the present invention will become more apparent from the following detailed description of the invention.

BRIEF EXPLANATION OF THE DRAWING

The appended drawing is a schematic diagram of the process of the present invention.

DETAILED DESCRIPTION OF THE INVENTION

The principal characteristics of the present invention are: the use of laterite or a laterite-containing catalyst to catalytically crack a heavy oil (i) to produce a cracked distillate; and (ii) to obtain a hydrogen-rich gas by contacting the catalyst on which coke is deposited by catalytic cracking with steam after carrying out reducing treatment.

Though the heavy oil used as a raw material in the present invention includes residual oils composed of heavy hydrocarbons such as atmospheric residual oil, vacuum residual oil, etc., inexpensive high Conradson carbon residual oils having a high boiling point are advantageously used.

The laterite used as a catalyst in the present invention exists naturally in abundance in tropical or subtropical zones and can be utilized by simply pulverizing, granulating and sintering without carrying out any chemical treatment. Hence, it is very advantageous from the viewpoint of its preparation and economy as compared with conventional synthetic catalysts. Laterite rich in aluminum hydroxide and iron hydroxide contains, generally, 30% or more iron. In the present invention, it is preferred that the iron content is higher. Particularly, laterites which contain about 30 to 60% by weight, preferably about 35 to 55% by weight of Fe when sintered at 1,000° C. for 3 hours can be advantageously utilized. When the iron content is over 60% by weight, the heat resistance of the catalyst deteriorates or bogging occurs (that is, agglomerated particles are formed upon sintering the catalyst particles), and when the iron content is lower than 30% by weight, the amount of hydrogen formed is low and the process is economically disadvantageous. Further, in the present invention, it is possible to use a catalyst which is prepared by mixing laterite and up to about 30% by weight of at least one member selected from nickel ore, pyrite cinder, magnetite, alumina, limestone, dolomite and calcium hydroxide.

In order to carry out catalytic cracking of a heavy oil in the presence of the above-described laterite catalyst, though a fixed bed process may be adopted, it is industrially desirable to adopt a fluidized bed process wherein the heavy oil is introduced into a fluidized bed held at about 450° to 600° C. under a pressure of about 0 to 15 kg/cm² G while the catalyst, prepared by pulverizing natural laterite or a laterite mixed material, granulating to form particles having an average particle size of about 60 to 500 microns and sintering at 900° C. or more, is introduced into the above-described fluidized bed to contact the heavy oil. In preparing the above-described laterite catalyst, natural laterite or a laterite mixed material may be treated with acids or alkalis to increase the catalytic activity.

As the cracking reaction proceeds, heavy metals are removed and the cracked distillate and coke are formed. Thus, the resulting cracked distillate is recovered from the system together with a fluidized gas, while the coke deposits on the laterite catalyst.

Though the amount of coke deposited on the catalyst increases as catalytic cracking proceeds, it is preferred in the present invention to adjust the amount of deposition so as to be about 2% to 15% by weight based on the catalyst. Particularly, in case of the fluidized bed process, the amount of coke deposition is preferably about 2 to 8% by weight, more preferably about 3 to 6% by weight. If the amount of coke deposited is too small, iron oxides in the laterite catalyst are not reduced sufficiently in the subsequent process. On the other hand, if the amount of coke deposited on the catalyst is too high, the activity of the catalyst decreases lowering the yield of the cracked distillate and the coke does not fully solidify on the catalyst leading to the formation of agglomerated particles.

The laterite catalyst on which coke is deposited as described above is then heated in a gas stream such as air, steam, nitrogen gas, etc., to about 750° to 950° C. whereby it is very quickly reduced. It is believed that the reduced laterite catalyst results by reduction of the iron oxides in the laterite catalyst according to the following equations (1) to (3).

$$Fe_2O_3 + C \rightarrow Fe_3O_4 + CO + CO_2 \quad (1)$$

$$Fe_3O_4 + C \rightarrow FeO + CO + CO_2 \quad (2)$$

$$FeO + C \rightarrow Fe + CO + CO_2 \quad (3)$$

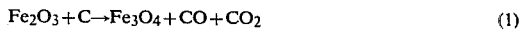

The above reduction reactions are more advantageously carried out as the reaction temperature increases or as the amount of coke deposited on the catalyst increases. However, regarding the reaction temperature, a high temperature, higher than 950° C., is not economically preferred, because the reactor tends to be damaged and problems would occur due to bogging during the operation. Accordingly, it is preferred to use a temperature of about 750° to 950° C. Further, regarding the amount of coke deposited, as described already, reduction is sufficiently carried out when the amount of coke deposited is about 2 to 15% by weight due to the characteristics of laterite. Further, in the above-described reduction, the entire system is heated by partial combustion of coke according to the following equations (4) and (5):

$$C + \tfrac{1}{2}O_2 \rightarrow CO \quad (4)$$

$$C + O_2 \rightarrow CO_2 \quad (5)$$

by which iron oxides in the catalyst are reduced according to the above-described equations (1) to (3). Moreover, when sulfur compounds are present in the coke, these sulfur compounds are reacted with the reduced laterite to form iron sulfide, whereby the sulfur content in the exhaust gas is drastically reduced.

A practical operation is advantageously carried out using a fluidized bed process, but in the fluidized bed process, if the amount of coke deposited on the catalyst is above 8%, bogging easily occurs. The laterite catalyst on which coke is deposited is fed to a fluidized bed zone held at about 750° to 950° C. under a pressure of about 0 to 15 kg/cm² G and an oxygen-containing gas such as air is introduced at the same time, by which a part of the above-described coke is burned to supply heat for the entire system and the iron oxides in the laterite catalyst are reduced. A suitable amount of the oxygen-containing gas fed is about 0.1 to 0.7 mole, preferably 0.2 to 0.5 mole, per mole of carbon in the coke calculated as oxygen. Further, an exhaust gas containing carbon dioxide and carbon monoxide (see equations (1) to (5)) is discharged from the system.

Then, the reduced laterite catalyst as described above is brought into contact with steam. By this contact, hydrogen is formed according to the following equations (6) to (8).

$$Fe + H_2O \rightarrow FeO + H_2 \quad (6)$$

$$FeO + H_2O \rightarrow Fe_3O_4 + H_2 \quad (7)$$

$$Fe_3O_4 + H_2O \rightarrow Fe_2O_3 + H_2 \quad (8)$$

The above-described reactions are advantageously carried out at lower temperatures from the standpoint of thermodynamics. However, from the viewpoint of practical operation, it is preferred to adopt a temperature between the cracking temperature and the catalyst regeneration temperature, and a temperature of about 600° to 950° C., preferably 600° to 800° C. is suitable. Further, the reaction operation is preferably carried out by the fluidized bed process wherein the reduced laterite catalyst and the steam are introduced into a gasification zone and are brought into contact with each other while holding the zone at about 600° to 950° C. under about 0 to 15 kg/cm² G pressure, by which hydrogen is formed according to equations (6) to (8). Further, in the above-described gasification zone, a part of the coke on the laterite catalyst reacts with steam to form carbon monoxide, carbon dioxide and hydrogen according to the following equations (9) and (10):

$$C + H_2O \rightarrow CO + H_2 \quad (9)$$

$$C + 2H_2O \rightarrow CO_2 + 2H_2 \quad (10)$$

However, by decreasing the amount of the coke on the laterite catalyst as much as possible (namely, by consuming the coke in the reduction treatment as much as possible), or by lowering the reaction temperature to 800° C. or less, i.e., by controlling the reactions expressed by the equations (9) and (10) as far as possible, the purity of the hydrogen formed in the gasification zone is high.

Thus, since the oxidation reactions of iron chiefly occur in the gasification zone, the hydrogen concentration in the resulting gas taken out of the system becomes very high and it becomes generally 75% by volume or more as a dry state. Further, the laterite catalyst in which the iron is oxidized as described above is reused by circulating it into the catalytic cracking zone for the heavy oil.

As will be understood from the above description, the laterite and the laterite-containing material used in the present invention have excellent characteristics as a catalyst for cracking the heavy oil, namely, (1) they are cheap, (2) iron oxides are easily reduced by the coke, (3) whereby hydrogen is easily formed, and (4) the catalytic activity is stable.

In the following, a practical operation of the present invention is explained with reference to the schematic diagram shown in the appended drawing.

In the drawing, a raw heavy oil is introduced into a fluidized bed held at about 450° to 600° C. under a pressure of 0 to 15 kg/cm$^2$ G at the lower part of the cracking zone 2 via the conduit 1. In the fluidized bed, the granular laterite catalyst is fluidized by a fluidizing gas introduced through the conduit 3. As the fluidizing gas, though steam is usually used, the cracking exhaust gas may also be used. In the cracking zone 2, the heavy oil is catalytically cracked by the laterite catalyst to form a cracked distillate and coke. The cracked distillate from which heavy metals were removed is removed in the gaseous state via the conduit 4 together with the fluidizing gas. On the other hand, the coke deposits on the laterite catalyst and is sent to the regenerating zone 6 through the transfer conduit 5. The regenerating zone 6 is held at about 750° to 950° C. under a pressure of about 0 to 15 kg/cm$^2$ G, and a part of coke deposited on the laterite catalyst is burned by an oxygen-containing gas such as air fed through the conduit 7, by which heat for the entire system is supplied and iron oxides in the laterite catalyst are reduced. The carbon dioxide and carbon monoxide-rich exhaust gas resulting from the reactions of the iron oxides with the coke and the reaction of coke with oxygen is discharged through the conduit 8. The laterite catalyst particles heated to about 750° to 950° C. are conveyed to the cracking zone 2 and the gasification zone 11 through the conduits 9 and 10, respectively. The reduced laterite catalyst is conveyed to the gasification zone 11 through the transfer conduit 10, where iron is oxidized by steam fed through the conduit 12 to yield hydrogen. Further, iron sulfide is decomposed by the steam. The gasification zone 11 is held at about 600° to 950° C. under a pressure of about 0 to 15 kg/cm$^2$ G. Since the oxidation reactions of iron are carried out mainly in the gasification zone 11, a hydrogen concentration in the resulting gas taken from the gasification zone 11 through the conduit 13 is very high and, generally, it is 75% by volume or more in the dry state. The oxidized laterite catalyst is circulated into the cracking zone 2 through the conduit 14.

As described above, according to the present invention, there is an advantage that a cracked distillate and hydrogen can be advantageously produced from a heavy oil using the laterite or the laterite-containing material which is available at a low price as a catalyst for catalytic cracking of the heavy oil.

The present invention will be described in further detail by reference to the following examples. Unless otherwise indicated, all parts, percents, ratios, etc., are by weight. In each example, the compositions of the catalysts used are shown in the following Table 1.

TABLE 1

| Kind of Catalyst | Fe (wt %) | Ni (wt %) | MgO (wt %) | SiO$_2$ (wt %) | Al$_2$O$_3$ (wt %) |
|---|---|---|---|---|---|
| Pyrite Cinder | 63.04 | 0.02 | 0.17 | 3.13 | 0.77 |
| Magnetite | 50.20 | 0.01 | 1.12 | 12.45 | 2.41 |

TABLE 1-continued

| Kind of Catalyst | Fe (wt %) | Ni (wt %) | MgO (wt %) | SiO$_2$ (wt %) | Al$_2$O$_3$ (wt %) |
|---|---|---|---|---|---|
| Laterite A | 50.2 | 1.06 | 0.52 | 1.81 | 2.39 |
| Laterite B | 57.9 | 1.23 | 0.76 | 2.44 | 2.83 |
| Laterite C | 46.5 | 1.07 | 3.57 | 0.54 | 8.36 |
| Garnierite | 13.48 | 2.81 | 30.23 | 39.07 | 2.23 |

EXAMPLE 1

In this example, the amount of coke formed in case of catalytic cracking of a heavy oil using laterite as a catalyst was compared to that formed using other catalysts. After each catalyst shown in Table 2 below was sintered at 1,000° C. for 3 hours in an electric furnace, 10 cc of each was put in a stainless steel tubular reactor having a 12.5 mm inside diameter, and cracking of Kuwait atmospheric residual oil was carried out in a fixed bed at 500° C. for 5 minutes. The results are shown in Table 2.

TABLE 2

| Catalyst | Yield of Cracking Product (% by weight) | | | | |
|---|---|---|---|---|---|
| | H$_2$ to C$_4$ | C$_5$ - 300° C. | 300° to 350° C. | Above 350° C. | Coke |
| Pyrite Cinder | 4.9 | 22.0 | 12.9 | 51.0 | 9.2 |
| Magnetite | 3.7 | 25.9 | 17.7 | 45.0 | 7.7 |
| Laterite B | 6.4 | 23.6 | 12.4 | 25.8 | 31.8 |
| α-Alumina | 3.7 | 10.6 | 12.5 | 58.3 | 4.9 |
| Garnierite | 4.4 | 29.0 | 14.0 | 36.9 | 15.7 |

It is understood from Table 2 that laterite which showed a high yield of coke is advantageous for producing hydrogen together with the cracked distillate.

EXAMPLE 2

In this example, the reduction rate of laterite on which coke deposited by catalytic cracking of a heavy oil was compared to that of other catalysts.

Using each catalyst shown in Table 3 below which was sintered at 1,000° C. for 3 hours, Kuwait atmospheric residual oil was catalytically cracked, by which coke deposited on the catalyst. About 31 cc of each catalyst on which coke deposited was put in a stainless steel tubular reactor. Nitrogen was fed from the lower part of the reactor at a rate of 0.25 l/min, and the catalyst was heated to 900° C. for 60 minutes in a nitrogen stream. The reduction rate of each catalyst after heating is shown in Table 3.

TABLE 3

| Catalyst | Coke Deposited (% by weight) | Reduction Rate (%) |
|---|---|---|
| Laterite A | 10.2 | 81 |
| Laterite C | 8.1 | 83 |
| Garnierite | 12.1 | 22 |
| Magnetite | 9.8 | 13 |

Here, the reduction rate is represented by a ratio of the amount of oxygen exhausted by heating as CO or CO$_2$ to the amount of oxygen combining with Fe and Ni on the assumption that Fe and Ni in the catalyst exist as Fe$_2$O$_3$ and NiO. It is understood from Table 3 that the reduction rate of laterite was remarkably high as compared to that of other catalysts.

It is also understood from Table 3 that the laterite is advantageous for producing hydrogen utilizing the oxidation-reduction of iron. Namely, the more the reduction of iron proceeds, the more the oxidation reactions of iron according to the above-described equations (6) to (8) proceeds.

EXAMPLE 3

In this example, the hydrogen concentration which results upon contacting the laterite on which coke deposited with steam to form hydrogen from water utilizing the oxidation-reduction of iron was compared to that which results using other catalysts. After being sintered at 1,000° C. for 3 hours, 15 cc of each catalyst shown in Table 4 below on which coke deposited was put in a stainless steel tubular reactor, and steam was fed from the lower part of the reactor at the rate of about 10 g/hr, by which hydrogen was produced from steam by the oxidation-reduction of iron. The reaction temperature was 800° C. The results obtained are shown in Table 4.

TABLE 4

| Catalyst | Coke Deposited (%) | Gas Yielded (Nl/hr)* | Hydrogen Concentration (mol %)* |
|---|---|---|---|
| Laterite A | 10.2 | 5.60 | 59.6 |
| α-Alumina | 14.6 | 2.00 | 59.0 |
| Magnetite | 9.84 | 1.58 | 38.0 |

Note:
*After the lapse of 30 minutes from the start of the reaction.

It is understood from Table 4 that the laterite shows the largest amount of gas formation and the highest hydrogen concentration.

EXAMPLE 4

Using a cracking zone having a 10 cm inside diameter, Kuwait vacuum residual oil having 17.5% by weight of residual carbon and 1.050 specific gravity and containing 30 ppm of nickel and 101 ppm of vanadium was catalytically cracked at 540° C. using laterite A as the catalyst according to the process described in the appending drawing, by which a cracked distillate having a boiling point less than 560° C. was obtained in a yield of 57% by weight based on the introduced vacuum residual oil. This cracked distillate had a specific gravity of 0.9354 and contained 1 ppm or less of nickel and vanadium. The coke deposited on the laterite in an amount of 6.73% by weight.

This coke deposited laterite was fed continuously to a fluidized bed type regeneration zone having an inside diameter of 6.9 cm to regenerate the catalyst using air as a fluidizing gas the the iron oxides in the catalyst were reduced at 845° C. The catalyst particles from the regeneration zone were conveyed continuously to the gasification zone through an overflow conduit.

The gasification zone contained a fluidized bed and had an inside diameter of 6.9 cm. In this gasification zone, oxidation of the reduced catalyst and production of hydrogen were carried out at 730° C. by introducing steam as a fluidizing gas. In this case, the amount of gas formed was 151 Nl/hr and the composition of gas was $H_2$: 98.6% by mol, CO: 0.65% by mol, and $CO_2$: 0.75% by mol. Methane was not detected.

EXAMPLE 5

Example 4 was repeated except that the amount of coke deposited on laterite was 3.82% by weight at the outlet of the cracking zone. Thus, the amount of gas formed was 101 Nl/hr, and the composition of the gas was $H_2$: 82.7% by mol, CO: 2.8% by mol and $CO_2$: 14.5% by mol.

EXAMPLE 6

This example demonstrates the use of garnierite with laterite.

A material prepared by mixing laterite A and garnierite in the ratio by weight of 7:3, granulating the mixture, molding and sintering at 1,200° C. for 3 hours was used as the catalyst. The composition of thus-resulted catalyst is shown in Table 5.

TABLE 5

| Fe (wt %) | Ni (wt %) | MgO (wt %) | $SiO_2$ (wt %) | $Al_2O_3$ (wt %) |
|---|---|---|---|---|
| 35.08 | 2.17 | 14.29 | 18.7 | 4.65 |

Catalytic cracking of Kuwait atmospheric residual oil was carried out by a batch fluidized bed process using the procedure described in Example 4 except that the above-described catalyst was used. The catalyst in which the amount of coke deposited was adjusted to 3.12% by weight was fed to the regeneration zone under the following conditions.

Reaction Temperature: 830° C.
Air Feed Rate: 915 Nl/hr
Catalyst Feed Rate: 7.62 kg/hr The catalyst reduced in the regeneration zone as described above (reduction rate: 23%) was introduced into the gasification zone together with steam to carry out the reaction at 700° C. The results obtained are shown below.

Amount of gas at outlet: 120 Nl/hr
Composition of gas at outlet (% by volume): $H_2$, 89.5; CO, Trace; $CO_2$, 4.2.

EXAMPLE 7

This sample shows the use of laterite in which calcium hydroxide was incorporated. A material produced by mixing laterite A with $Ca(OH)_2$ so that the Fe/Ca molar ratio was 7/3 was granulated, molded and sintered at 1,100° C. for 3 hours to produce a catalyst. Thus, the resulted catalyst had the composition shown in Table 6.

TABLE 6

| Fe (wt %) | Ni (wt %) | MgO (wt %) | $SiO_2$ (wt %) | CaO (wt %) |
|---|---|---|---|---|
| 45.8 | 0.83 | 0.81 | 1.98 | 21.5 |

The same procedure as that in Example 4 was carried out except that the amount of coke deposited on the laterite was 9.98% by weight at the outlet of the cracking zone. Thus, the amount of gas formed was 180 Nl/hr, and the composition of gas was $H_2$: 75.4% by mol, CO: 10.4% by mol and $CO_2$: 14.2% by mol.

While the invention has been described in detail and with reference to specific embodiments thereof, it will be apparent to one skilled in the art that various changes and modifications can be made therein without departing from the spirit and scope thereof.

What is claimed is:
1. A process for producing a cracked distillate and hydrogen from a heavy oil which comprises cracking the heavy oil in the presence of laterite or a laterite-containing catalyst while simultaneously depositing coke on said laterite or laterite-containing catalyst, reducing the laterite or laterite-containing catalysts on which the coke is deposited while simultaneously burning the coke in a reducing atmosphere, and forming a hydrogen-rich gas by contacting the reduced laterite or laterite-containing catalyst with steam.

2. The process of claim 1, wherein said laterite contains about 30 to 60% by weight of iron.

3. The process of claim 1, wherein said cracking is conducted at a temperature of about 450° to 600° C. under a pressure of about 0 to 15 kg/cm² G.

4. The process of claim 1, wherein said coke is deposited on said catalyst in an amount of about 2% to 15% by weight based on the weight of the catalyst.

5. The process of claim 1, wherein said coke is deposited on said catalyst in an amount of about 2 to 8% by weight based on the weight of the catalyst.

6. The process of claim 1, wherein said catalyst having coke deposited thereon is reduced at a temperature of about 750° to 900° C.

7. The process of claim 1, wherein said reduced catalyst is contacted with steam at a temperature of about 600° to 950° C. under a pressure of about 0 to 15 kg/cm² G whereby hydrogen is formed.

8. A fluidized bed process for producing a cracked distillate and hydrogen from a heavy oil which comprises introducing said heavy oil into a first reaction zone containing a fluidized bed of laterite or a laterite-containing catalyst at a temperature of about 450° to 600° C. under a pressure of about 0 to 15 kg/cm² G and simultaneously depositing coke on said catalyst, removing the cracked distillate from said reaction zone and circulating said coke deposited laterite catalyst to a second reaction zone wherein said coke deposited laterite catalyst is fluidized and reduced at a temperature of about 750° to 950° C. under a pressure of about 0 to 15 kg/cm² G while simultaneously burning the coke in a reducing atmosphere, circulating said reduced laterite catalyst to a third reaction zone wherein said catalyst is fluidized and contacted with steam at a temperature of about 600° to 950° C. under a pressure of about 0 to 15 kg/cm² whereby a hydrogen-rich gas is formed.

9. The process of claim 8, wherein upon completion of the reaction in said third reaction zone, said oxidized laterite catalyst is recirculated to said first reaction zone for reuse.

10. The process of claim 9, wherein said laterite or laterite-containing catalyst contains about 30 to 60% by weight of iron.

11. The process of claim 1 or claim 8, wherein said laterite-containing catalyst is a mixture of laterite and up to about 30% by weight of at least one member selected from nickel ore, pyrite cinder, magnetite, alumina, limestone, dolomite and calcium hydroxide.

12. The process of claim 1 or claim 8, wherein said laterite or laterite-containing catalyst is prepared by pulverizing natural laterite or a laterite mixed material, granulating to form particles having an average particle size of about 60 to 500 microns and sintering at 900° C. or more.

13. The process of claim 1 or claim 8, wherein the reduction of said laterite or laterite-containing catalyst is carried out by introducing an oxygen-containing gas in an amount of about 0.1 to 0.7 mole per mole of carbon in the coke calculated as oxygen.

14. The process of claim 1 or claim 8, wherein when reducing said laterite or laterite-containing catalyst, sulfur compounds present in the coke are converted to iron sulfide which is then decomposed by steam when forming hydrogen.

15. The process of claim 9, wherein a part of said laterite or laterite-containing catalyst in the second reaction zone is circulated into the first reaction zone.

* * * * *